US012685614B2

(12) United States Patent　(10) Patent No.:　US 12,685,614 B2
Armani et al.　(45) Date of Patent:　Jul. 21, 2026

(54) DENTAL HANDPIECE AND AXIAL GROOVE BALL BEARING

(71) Applicant: GEBR. REINFURT GMBH & CO. KG, Rimpar (DE)

(72) Inventors: Daniel Armani, Marktheidenfeld (DE); Herbert Niedermeier, Poppenhausen (DE); Marcel Von Der Gönna, Marktheidenfeld (DE)

(73) Assignee: GEBR. REINFURT GMBH & CO. KG, Rimpar (DE)

( * ) Notice: Subject to any disclaimer, the term of this patent is extended or adjusted under 35 U.S.C. 154(b) by 888 days.

(21) Appl. No.: 17/775,059

(22) PCT Filed: Nov. 6, 2020

(86) PCT No.: PCT/EP2020/081374
§ 371 (c)(1),
(2) Date: May 6, 2022

(87) PCT Pub. No.: WO2021/089838
PCT Pub. Date: May 14, 2021

(65) Prior Publication Data
US 2022/0395352 A1　Dec. 15, 2022

(30) Foreign Application Priority Data
Nov. 6, 2019　(DE) ..................... 10 2019 129 940.3

(51) Int. Cl.
*A61C 1/18*　　(2006.01)
*A61C 1/05*　　(2006.01)
(Continued)

(52) U.S. Cl.
CPC ................ *A61C 1/181* (2013.01); *A61C 1/05* (2013.01); *F16C 19/10* (2013.01); *F16C 33/586* (2013.01); *F16C 2316/13* (2013.01)

(58) Field of Classification Search
CPC .. A61C 1/181; A61C 1/00; A61C 1/10; A61C 1/12; A61C 1/14; A61C 1/141;
(Continued)

(56) References Cited

U.S. PATENT DOCUMENTS 3,074,167 A * 1/1963 Turchi ................... A61C 1/141
279/22
5,336,089 A * 8/1994 Sakurai .................. A61C 1/181
D24/176
(Continued)

FOREIGN PATENT DOCUMENTS

AT　　E65891 B　　9/1988
CN　118593152 A * 9/2024 ........... A61C 8/0089
(Continued)

OTHER PUBLICATIONS

WIPO, International Search Report for PCT/EP2020/081374, Dec. 14, 2020.
(Continued)

*Primary Examiner* — Edward Moran
(74) *Attorney, Agent, or Firm* — Hodgson Russ LLP

(57)　　ABSTRACT

The dental handpiece consists of a housing with a handle and a turbine that can be operated with compressed gas or compressed air. The rotational movement of the turbine driven by compressed gas is transmitted to the dental tool via a rotor shaft and a chuck. The rotor shaft is rotatably supported by at least one axial groove ball bearing. The radial rigidity required for operating a dental handpiece is achieved by axially preloading the ball bearings. Projections on the housing and the shaft disc of the at least one axial groove ball bearing allow the axial groove ball bearing to be used as radial groove ball bearings. The proposed design of the dental handpiece exhibits little power loss or frictional loss in comparison to dental handpieces with radial groove (Continued)

ball bearings, and slip and drilling friction components can be virtually completely prevented in particular.

3 Claims, 7 Drawing Sheets

(51) Int. Cl.
F16C 19/10 (2006.01)
F16C 33/58 (2006.01)

(58) Field of Classification Search
CPC .... A61C 1/18; A61C 5/40; A61C 5/42; A61C 17/005; F16C 19/10; F16C 2316/13
See application file for complete search history.

(56) References Cited

U.S. PATENT DOCUMENTS

| | | | | |
|---|---|---|---|---|
| 5,795,167 A | * | 8/1998 | Brenner | ................. A61C 1/185 433/132 |
| 2003/0207233 A1 | | 11/2003 | Lingenhole et al. | |
| 2008/0261170 A1 | * | 10/2008 | Ploy | ................... A61B 17/1622 384/549 |
| 2011/0059418 A1 | * | 3/2011 | Damato | .................. F16C 33/44 384/527 |
| 2016/0228210 A1 | * | 8/2016 | Suzuki | .................. F16C 25/083 |
| 2018/0256290 A1 | | 9/2018 | Niedermeier | |

FOREIGN PATENT DOCUMENTS

| | | | |
|---|---|---|---|
| DE | 192858 | 12/1907 | |
| DE | 2524917 | 1/1976 | |
| DE | 2943483 | 5/1981 | |
| DE | 3302545 A1 | 10/1983 | |
| DE | 102004053194 | 5/2006 | |
| DE | 102007004716 | 8/2008 | |
| DE | 102007059876 | 6/2009 | |
| DE | 102011081881 | 2/2013 | |
| GB | 275275 | 8/1927 | |
| GB | 478825 | 1/1938 | |
| JP | 2005501599 | 1/2005 | |
| JP | 2018528831 | 10/2018 | |
| WO | 2009074413 | 6/2009 | |
| WO | WO-2018189229 A1 * | 10/2018 | ............ F16C 41/001 |

OTHER PUBLICATIONS

JPO, Office Action for JP Application No. 2022-526523, Aug. 6, 2024.

CNIPA, Second Office Action for CN Application No. 202080091885. 4, Sep. 25, 2024.

CNIPA, First Office Action for CN Application No. 202080091885. 4, May 22, 2024.

* cited by examiner

- Prior art -

DENTAL HANDPIECE AND AXIAL GROOVE BALL BEARING

CROSS-REFERENCE TO RELATED APPLICATIONS

This application is a U.S. national stage entry of International Application No. PCT/EP2020/081374, filed Nov. 6, 2020, which claims priority to German Application No. 10 2019 129 940.3, filed Nov. 6, 2019, the entire disclosures of which are incorporated by reference herein.

FIELD OF THE INVENTION

The invention relates to dental handpieces that can be fitted with a large number of different dental tools for dental treatment. These include, drills, milling cutters, files, polishers, smoothers and/or finishers, for example. Before the dental treatment, the tools are clamped into the dental handpiece and made to rotate using a pneumatic drive. The drive is effected by a turbine that is operated with compressed gas or compressed air. The gas or the drive air is generally supplied to the turbine through channels in the dental handpiece. The associated rotational movement of the turbine and the dental tool it drives is characterised by high speeds of up to 500,000 revolutions per minute.

The practical requirements for a dental handpiece, in particular the high speeds, pose a multitude of challenges for the storage of the rotating components in the dental handpiece and for the dental tools clamped in them. The storage therefore usually has the help of roller bearings, such as ball bearings. They enable a bearing that ensures safe and low-vibration use of the dental handpiece, even at high speeds. The roller bearings support a rotor or hollow shaft of the pneumatic drive, in which the dental tool can be clamped with the help of a chuck or a collet.

The roller bearings not only have to ensure permanent and smooth or quiet operation at high speeds-they also have to cope with the typically very high acceleration and deceleration of the rotor shaft and the dental tools. The associated stresses arise, for example, when the dental handpiece is put into operation or during the dental treatment itself when the dental tool is pressed onto a tooth with the force required for the treatment.

The forces applied during the treatment not only lead to friction losses and the associated deceleration and acceleration of the dental tool, but also to tilting of the tool in the dental handpiece or corresponding tilting moments, which are introduced from the tool directly into the roller bearings via the rotor or hollow shaft. Depending on the strength of the forces used, this can lead to overloading of the bearings.

Tilting of axes, e.g. of bearing axes and/or tool axes, does not only occur in dental treatment—it is often the result of the narrow installation space in a dental handpiece. The installation space is severely limited by the specifications of the dental device manufacturers. Thus, in most cases, the inner diameter of the roller bearing is fixed at 3.175 mm (⅛ inch), the outer diameter at 6.35 mm (¼ inch) and the width at 2.779 or 2.38 mm. Due to the fact that the ball bearings for vibration damping are preferably supported in the housing on O-rings and are preloaded against each other in the axial direction by a wave spring disc, the rotor shaft can assume a tilted position when the drilling tool is loaded. Even minor imbalances, which lead to considerable vibrations and noise due to the high speeds, are perceived as reducing quality.

A further problem is the discharge of lubricant through the compressed gas or the compressed air that is guided through the pneumatic drive or the turbine and the dental handpiece. Some of the exhaust air from the turbine flows through the ball bearings and conveys the lubricant to the outside, so that a lack of lubrication occurs after a short time. After each dental treatment, the handpiece is cleaned for hygiene by rinsing it with water and/or alkaline cleaning agents, lubricating it and sterilising it with superheated steam.

DESCRIPTION OF THE RELATED ART

Some of the problems just presented have already been solved in U.S. Pat. No. 4,249,896 A. The document proposes a dental handpiece with two radial groove ball bearings, which are arranged both on an upper and on a lower area of the rotor shaft of a dental handpiece with a chuck. The ball bearings can thus exert leverage on the chuck, which stabilise the chuck and a tool clamped therein against tilting. In a sectional view, the associated tilting or load axes connect the two ball bearings to one another in an X shape, which is why this arrangement is also referred to as an X arrangement. In addition, the ball bearings are mounted in the housing with the help of elastic O-rings to dampen vibrations that are transmitted to the housing.

DE 10 2015 012 332 A1 represents a further development of such dental handpieces. There, further measures to compensate for tilting effects are presented, which aim primarily to reduce the elliptical character of the running track in the event of tilting by equipping the outer ring raceway with three different zones. This prevents or compensates for the balls of the ball set running at different speeds when tilted and the ball bearing cage wearing out prematurely as a result of constraining forces from the ball set and consequently the ball bearing failing.

The problem of the lubricant discharge by the compressed gas or compressed air is compensated for by the adhesion promoter layer, which was described in DE 10 2014 220 872 A1. The layer attracts lubricants and is conveniently applied to the surfaces of the balls, the inner and/or outer ring of the proposed radial groove ball bearing.

Despite these advances, the dental handpieces known from the prior art still have a number of problems. They arise due to the nature of these tribological systems. In particular, the radial groove ball bearings indicate power losses and wear due to drilling friction and slip. In this way, not only can a considerable part of the drive energy be consumed, but the service life of the ball bearings can also be significantly reduced.

OBJECT

It is therefore the object of the invention to provide dental handpieces with low power losses and wear, which are also characterised by high resilience, low noise emission and smooth running.

BRIEF SUMMARY OF THE INVENTION

This object is achieved by the subject matter of the independent claim. Preferred further developments are specified in the dependent claims. The use of the singular is not intended to exclude the plural, which also applies vice-versa, unless otherwise disclosed.

To achieve the object, a dental handpiece for rotating a rotating dental tool is proposed. The rotating dental tool can be a tool for drilling, milling, grinding, filing, polishing and/or finishing or smoothing. The dental handpiece consists of a housing with a handle that typically has channels for supplying and removing compressed gas or compressed air. The housing also comprises a chuck for receiving the dental tool and a turbine. The turbine has a turbine wheel and a rotor shaft connected to the turbine wheel and is connected to the chuck of the dental handpiece through the rotor shaft. For this purpose, the rotor shaft can be designed as a hollow shaft that accommodates the chuck in its cavity.

The turbine can be driven by means of compressed gas or compressed air, which can be guided to the turbine through the inlet and outlet air ducts in the handle for this purpose. In the turbine the compressed gas or compressed air hits the turbine wheel and drives it. The rotational movement of the turbine wheel and the corresponding torque is transmitted to the chuck and, if necessary, to a dental tool clamped therein with the aid of the rotor shaft connected to the turbine wheel. In this way, the chuck and the dental tool possibly clamped therein can be driven in rotation.

The design of the dental handpiece also provides for at least one axial groove ball bearing with a plurality of rolling elements. The axial groove ball bearing is housed in the housing and supports the rotor shaft both when rotating and when not in use. For this purpose, the axial groove ball bearing has a shaft disc, which is connected to the rotor shaft, and a housing disc, which is used to mount or fix the bearing in the housing of the dental handpiece. In the case of a typically used ball bearing, the rolling elements represent balls.

Axial groove ball bearings have lower power losses or friction losses than radial groove ball bearings. In particular, slip components can be almost completely avoided or even ruled out. Thus, in addition to reducing noise emission while the dental tool is being driven, the service life of the dental handpiece can also be extended.

Due to the axial arrangement of the shaft disc, rolling elements and housing disc, axial groove ball bearings have an axial load direction due to their construction. They are generally suitable for absorbing axial forces, but in many cases have insufficient rigidity or resistance to radial forces. For this reason, the prejudice has been established that axial groove ball bearings are unsuitable for use in dental handpieces where radial forces are generated by high asymmetric external loads during drilling, milling, grinding, filing, polishing and/or finishing or smoothing, among other things, by tilting or tilting moments of the dental tool are unavoidable. A person skilled in the art would therefore not consider using an axial groove ball bearing in dental handpieces due to its poorer radial rigidity compared to radial groove ball bearings for use in dental handpieces, but instead would choose bearings with a radial load direction, in particular radial groove ball bearings. However, this is confirmed neither in simulations and calculations of dental handpieces with axial groove ball bearings, nor in practice.

The proposed dental handpiece, which is equipped with axial groove ball bearings, can be constructed using commercially available components, which keeps production costs low. In addition, the design according to the invention can absorb higher loads in the axial direction, especially when static loads act on the ball bearings when the collet is actuated to change the drilling tool.

Commercially available groove ball bearings can be used in dental handpieces according to the invention. However, these have the disadvantage that the shaft disc, housing disc and cage with ball set do not form a closed unit and disintegrate during assembly or disassembly, which makes handling very complicated. However, for better seating of the bearing in the dental handpiece, in particular for a larger outer bearing surface of the housing disc, it is advantageous if the housing disc of the axial groove ball bearing has a projection that extends in the axial direction of the bearing. The projection is designed in such a way that it covers the rolling elements of the axial groove ball bearing. The remaining components of the bearing are simple and inexpensive bearing components. This applies in particular to rolling elements, a rolling element cage that may be present and the shaft disc.

The projection also reduces the amount of lubricant discharged from the axial groove ball bearing, in particular the portion of the lubricant discharge that occurs when compressed gas or compressed air flows through the dental handpiece.

The radial rigidity of the axial groove ball bearings can be improved, for example, by increasing the axial preload, for example from the 2 N that is usual for radial bearings in a dental turbine to a higher value that is greater than or equal to 3 N and less than or equal to 8 N, but preferably is 5 N (N denotes the unit of force Newton). With such an increased preload, the resistance force or the radial rigidity of a conventional axial groove ball bearing can also be increased in relation to radial forces to the level required for dental handpieces.

The components of the proposed dental handpieces have only been shown as individual components for better understanding. In one embodiment, the components may be embodied as separate components. In preferred embodiments, two or more of these individual components can also be made in one piece. This applies, for example, to the shaft disc of the at least one axial groove ball bearing and the turbine wheel of the dental handpiece, which are not only available as individual components but can also be made in one piece. Likewise, the shaft discs and the rotor shaft and/or the turbine wheel can be made in one piece. In these cases, the raceways of the shaft discs are already integrated into the corresponding plane surfaces of the turbine wheel or the rotor shaft. Accordingly, such embodiments according to the invention do not have individual bearings, but rather a design in which the bearings are integrated into the turbine wheel or the rotor shaft. This leads to a simplified assembly of the dental handpiece.

The object is also achieved by an axial groove ball bearing that comprises a plurality of rolling elements. Furthermore, the axial groove ball bearing has a shaft disc, which can be connected to a shaft, and a housing disc which is used to mount or fix the bearing in a housing. The rolling elements are arranged between the raceways of the shaft and housing discs—similar to a radial groove ball bearing. However, the associated raceways are not arranged in the radial direction but in the axial direction.

In contrast to commercially available axial groove ball bearings, axial groove ball bearings according to the invention have housing discs with a projection that extends in the axial direction of the bearing. The projection is designed in such a way that it covers the rolling elements of the axial groove ball bearing. The projection increases the outer surface area or the bearing surface, which can be used to preload and/or mount or fix the bearing in a housing.

The projection also reduces the lubricant discharged from the axial groove ball bearing, in particular the portion of the lubricant discharge that occurs when compressed gas or compressed air flows through the bearing.

The rolling elements do not have to be completely covered by the projection. In order to protect or even shield them from external influences, it makes sense in many cases if the housing disc, including the projection, extends over 95% to 105% of the width of the bearing.

Due to the axial arrangement, axial groove ball bearings are not protected against disintegration in contrast to many radial groove ball bearings. This can be particularly problematic during assembly. In contrast, radial groove ball bearings are protected against disintegration due to their design.

To simplify assembly, an axial groove ball bearing with an axial overlap of the housing disc including a projection of 95% to 105% of the bearing width can also be equipped with protection against falling apart. To this end, the projection is provided with a groove, wherein the groove is formed on the inside of the projection, i.e. the side of the projection closest to the rolling elements. Furthermore, the shaft disc can be provided with a step in the area of the groove, so that the shaft disc has a first part with a smaller outside diameter and a second part with a larger outside diameter. The part with the smaller outer diameter is arranged in such a way that a snap ring can be inserted into the bearing from the outside in order to snap it into the groove of the projection. The second part of the shaft disc is accordingly designed in such a way that a snap ring snapped into the groove locks the shaft disc against axial displacement. The axial groove ball bearing can thus be secured against disintegrating. This considerably simplifies the assembly of the axial groove ball bearing on the rotor shaft and in the housing of the turbine head.

The proposed axial groove ball bearing with a cantilever offers another possibility to protect the bearing from disintegrating. To do this, a ring is attached to the flat surface of the projection—e.g. welded- and the shaft disc is provided with a step in the area of the ring, so that the shaft disc has a first part with a smaller outside diameter and a second part with a larger outside diameter. The part with the smaller outer diameter is arranged in such a way that the ring engages in the step formed by the two parts after it has been fixed to the projection. The second part of the shaft disc is designed in such a way that the ring attached to the projection locks the shaft disc against axial displacement and thus protects the axial groove ball bearing from disintegrating.

In addition to projections on the housing disc, axial groove ball bearings according to the invention can also be designed with a projection on the shaft disc. The projection is designed in such a way that it covers the rolling elements of the axial groove ball bearing. The projection increases the width of the bore (internal diameter) or the inner contact surface that can be used to connect the bearing to a shaft. In this way, the fit of the axial groove ball bearing on a shaft can be improved.

As before, the rolling elements need not be completely covered by the projection of the shaft disc. In order to further improve the fit on the rotor shaft, however, it makes sense if the shaft disc, including the projection, extends over 95% to 105% of the width of the bearing.

In particularly preferred embodiments, the housing disc, including the projection, and the shaft disc, including the projection, extend over 95% to 105% of the width of the bearing. In addition, as described above, the axial groove ball bearing is secured against disintegrating by a snap ring and a corresponding groove or step. In these cases, the axial groove ball bearing looks like a radial groove ball bearing when viewed from the outside and can be mounted on the rotor shaft or in the turbine head just like a radial groove ball bearing. Despite the fact that the rolling elements are radially covered on both sides, the axial groove ball bearing only takes up a minimal amount of space or space that is no larger than that of a comparable radial groove ball bearing.

In axial groove ball bearings according to the invention, the raceways of the rolling elements can be machined into the shaft or housing discs using suitable grinding or honing technologies. In order to make grinding in the raceways easier, the rolling elements can be arranged on the outer edge of the shaft disc of the axial groove ball bearing, i.e. the raceways of the rolling elements have the largest possible diameter—for a given size of the shaft disc and other components, such as a ball bearing cage that may be present. This is particularly advantageous when the shaft disc is equipped with a projection on its inner edge. The projection and the raceway on the shaft disc are as far apart as possible, so that more space is available for the use of the corresponding grinding or honing tools.

The rolling elements can also be arranged on the inner edge of the shaft disc of the axial groove ball bearing. The raceways therefore have a smaller radius, so that the rolling elements have to cover as little distance as possible per rotation of the shaft. Such an arrangement of the rolling elements offers additional advantages if the housing disc is equipped with a projection on its outer edge. The projection and the raceway of the rolling elements on the housing disc are as far apart as possible, so that more space is available for the use of the corresponding grinding or honing tools.

The rolling elements can be located in a rolling element cage, which separates the rolling elements from one another. In particular, the rolling element cage keeps the rolling elements at the same distance from one another and thus prevents the rolling elements from slipping in the raceway or from touching and/or interfering with one another. This enables more reliable operation, e.g. at high speeds. In many cases, the rolling element cage keeps the balls evenly spaced. Alternatively, the axial groove ball bearing can also be operated as a full complement variant without a rolling element cage.

The raceway of the rolling elements can be shifted to larger diameters if the rolling element cage does not completely enclose the rolling elements on the outside. In this case, the rolling element cage is only closed on the inside and the outer diameter of the shaft disc is given by the raceway diameter and the rolling element diameter.

The raceway of the rolling elements can be shifted to smaller diameters if the rolling element cage does not completely enclose the rolling elements on the inside. In this case, the rolling element cage is only closed on the outside.

Further details and features will emerge from the following description of preferred exemplary embodiments in conjunction with the figures. Here, the respective features can be implemented individually or in combination with one another. The possibilities for achieving the object are not limited to the exemplary embodiments. For example, specified ranges thus always comprise all intermediate values (not stated) and all conceivable sub-ranges.

BRIEF DESCRIPTION OF THE DRAWINGS

The exemplary embodiments are shown schematically in the figures. Like reference signs in the individual figures denote like or functionally like elements or elements that correspond to one another in respect of their function. In the figures.

DETAILED DESCRIPTION OF THE INVENTION

Figure 1:
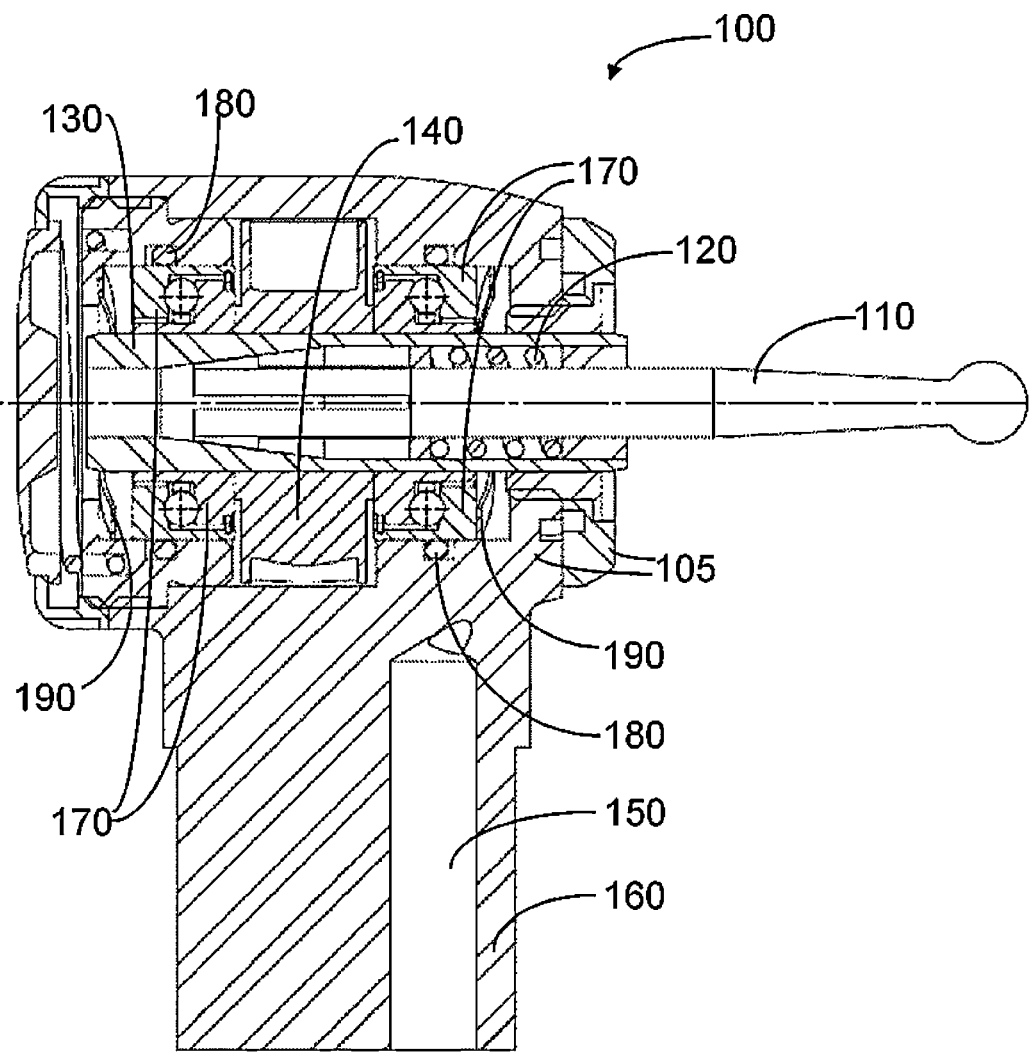
FIG. 1 shows a dental handpiece with axial groove ball bearings.

FIG. 1 shows a dental handpiece 100 with a housing 105 and a dental tool 110. The dental tool 110 is clamped in a chuck 120 that is located in the housing 105 of the dental handpiece 100. The chuck 120 is firmly connected to a rotor shaft 130 and via the rotor shaft 130 to a turbine wheel 140. Due to the fixed connection, the rotor shaft 130 can transmit rotational movements and torques of the turbine wheel 140 to the chuck 120 and the dental tool 110 clamped therein. The rotational movements or moments arise when the turbine wheel 140 is driven with the aid of compressed air. For this purpose, the compressed air is routed via channels 150 in a handle 160 of the dental handpiece 100 via the turbine wheel 140. The turbine wheel 140 and rotor shaft 130 represent the turbine or the pneumatic drive of the dental handpiece 100 which is supplied with compressed air via the inlet and outlet air channels 150 of the handle 160.

In this exemplary embodiment, the rotor shaft 130 is designed as a hollow shaft. It is rotationally supported by two axial groove ball bearings 170, i.e. the ball bearings support the rotor shaft both at rest and when the rotor shaft is rotating. The axial groove ball bearings 170 are arranged on an upper and on a lower area of the rotor shaft 130.

The axial groove ball bearing 170 is typically fixed or supported with the aid of an additional elastic element in order to dampen or reduce vibrations of the turbine in the dental handpiece, which is operated with compressed gas or compressed air, and the associated noise. For this purpose, the elastic element consists of, for example, an elastic material or elastomer and can be ring-shaped, designed as an O-ring 180 or the like. The axial groove ball bearings 170 are also mounted in the housing 105 of the dental handpiece 100 with the aid of wave spring discs 190.

The arrangement of the axial groove ball bearings 170 on an upper and on a lower area of the rotor shaft 130 counteracts tilting of the tool axis in the dental handpiece 100 and thus stabilises the dental tool 110 and the rotor shaft 130 in the dental handpiece 100. This prevents the ball bearings 170 from being overloaded as a result of the dental tool 110 tilting.

The O-rings 180 support the ball bearings 170 in the radial direction. The wave spring discs 190 support the bearings 170 in the axial direction. The elastic or resilient mounting in the radial direction dampens oscillations and vibrations of the pneumatic drive, in particular of the turbine wheel 140 and the rotor shaft 130.

The wave spring discs 190 preload the axial groove ball bearings 170 with an axial force. The preload produces a radial rigidity of the axial groove ball bearings 170 that is sufficient for dental handpieces 100.

Figure 2:
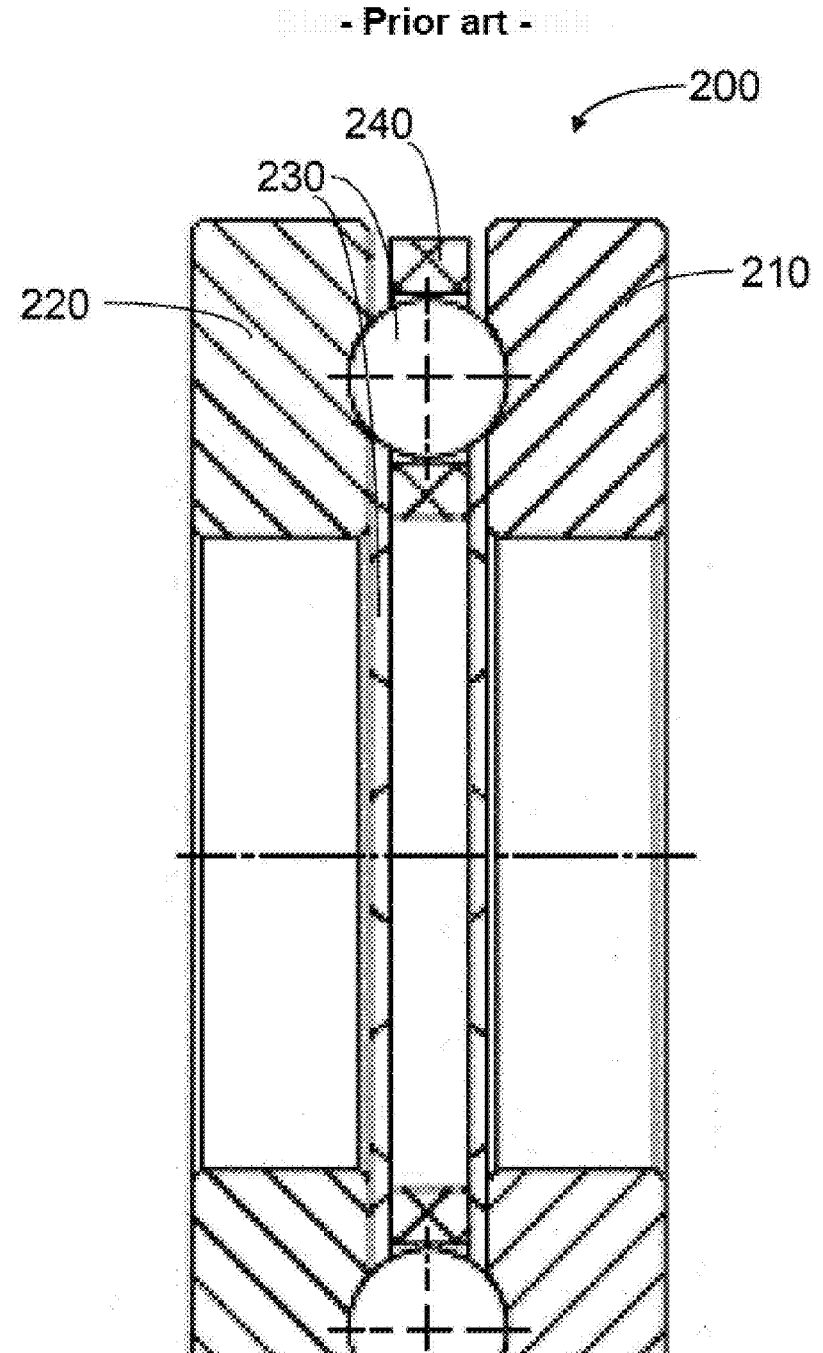
FIG. 2 shows an axial groove ball bearing according to the prior art.

FIG. 2 shows a conventional or commercially available axial groove ball bearing 200.

The axial groove ball bearing 200 consists of a housing disc 210, a shaft disc 220 and a plurality of balls 230. The balls 230 are arranged between the housing disc 210 and the shaft disc 220. They are also separated from one another by a ball bearing cage 240 and kept at the same distance from one another.

If the axial groove ball bearing 200 is used in a dental handpiece, the shaft disc 220 protrudes inwards slightly beyond the housing disc 210. Likewise, the housing disc 210 protrudes slightly beyond the shaft disc 220.

The ball bearing cage 240 ensures that the balls 230 are evenly arranged along their raceways in the ball bearing 200. It also prevents the balls from touching, rubbing against one another, moving one another and/or impeding their circulation. This is essential for high speed operation of the ball bearing, especially under load, to prevent ball bearing overload and wear.

Figure 3:
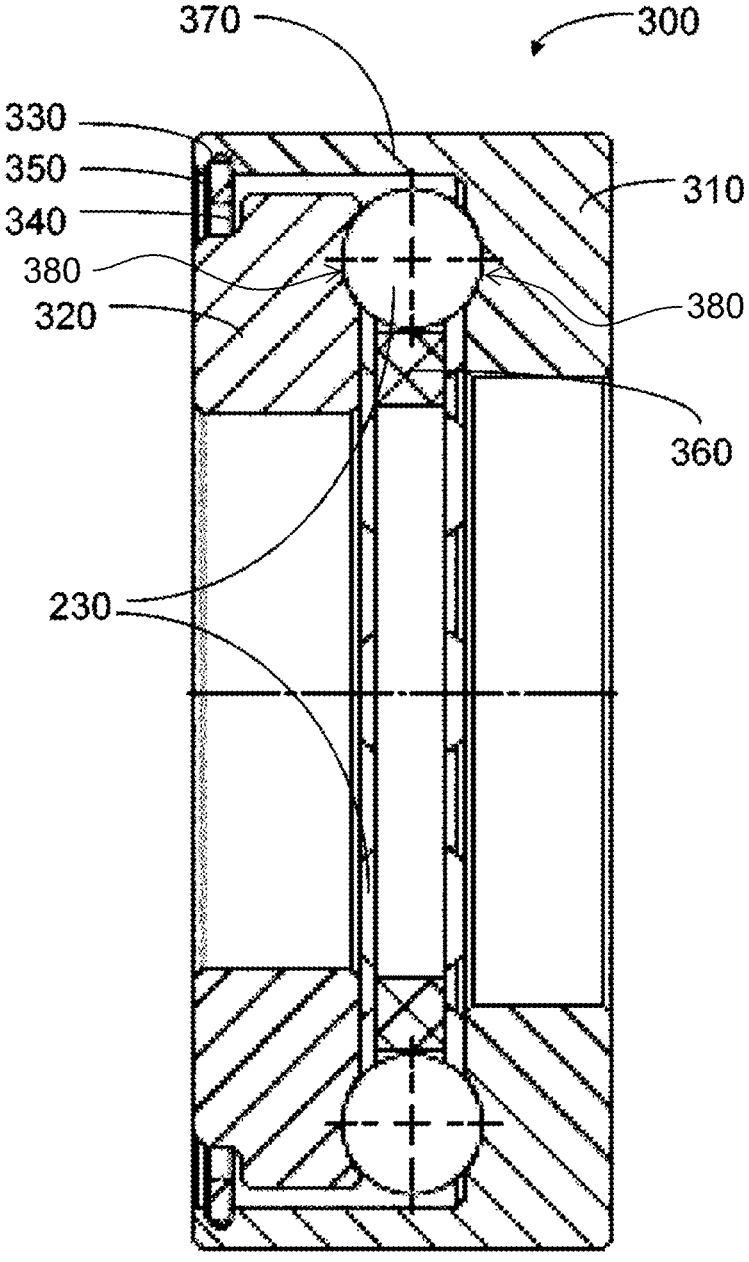
FIG. 3 shows an axial groove ball bearing with a projection on the housing disc.

FIG. 3 shows an axial groove ball bearing 300 which, in contrast to the axial groove ball bearing 200, has a housing disc 310 with a projection 370 and a shaft disc 320 with a step 340. The projection 370 is on the outside of the housing disc 310 and covers the balls 230 of the axial groove ball bearing 300. Furthermore, the projection 370 has a groove 330. The groove 330 can receive a snap ring 350. The snap ring 350 can be introduced into the axial groove ball bearing 300 via the step 340. The step 340 is also designed in such a way that the snap ring 350 locks the shaft disc 320 against axial displacement when it is mounted or engaged in the groove. The axial groove ball bearing 300 also has a ball bearing cage 360. The ball bearing cage 360 keeps the balls 230 evenly spaced apart from one another. The shaft disc 320 and the housing disc 310 are spaced apart in an axial direction of the rotor shaft 130 and define opposing bearing surfaces 380 that overlap in the axial direction of the rotor shaft 130. The rolling elements (balls 230) are arranged between the shaft disc 320 and the housing disc 310 in the axial direction of the rotor shaft 130 in contact with the opposing bearing surfaces 380.

The projection 370 increases the area with which the axial groove ball bearing 300 can be mounted, e.g. in a housing 105 of a dental handpiece 100. It can therefore be mounted more stably than, for example, an axial groove ball bearing 200.

The projection also reduces the discharge of lubricant from the axial groove ball bearing 300, for example by compressed air flowing into the axial groove ball bearing 300. The protection consists in the fact that the projection 370 together with the housing disc 310, the shaft disc 320 and the snap ring 350 forms a labyrinthine system which forces the medium to flow through at least one, two or even three changes of direction. The compressed air has to get through this labyrinth in order to have an effect on the balls and their lubrication. In this way, negative external influences are avoided or at least mitigated.

After mounting the snap ring 350, the axial groove ball bearing 300 is protected against falling apart and can be mounted on the rotor shaft or in the housing of the turbine head like a radial groove ball bearing.

In contrast to the cage 240, the ball bearing cage 360 does not completely enclose the balls 230. It is open to the outside. Accordingly, the raceway of the balls 230 in the axial groove ball bearing 300 is further to the outside in comparison to the conventional axial groove ball bearing 200, i.e. the raceway has a larger diameter.

An alternative embodiment (not shown) very similar to the embodiment shown in FIG. 3 has a longer projection of the housing disc compared to projection 370. In this extended projection there is again a groove 330 into which the snap ring 350 can be inserted. This is designed in such a way that it secures the shaft disc against axial displacement when it is engaged in the groove. By lengthening the projection, the formation of a step 340 in the shaft disc can be omitted.

Figure 4:
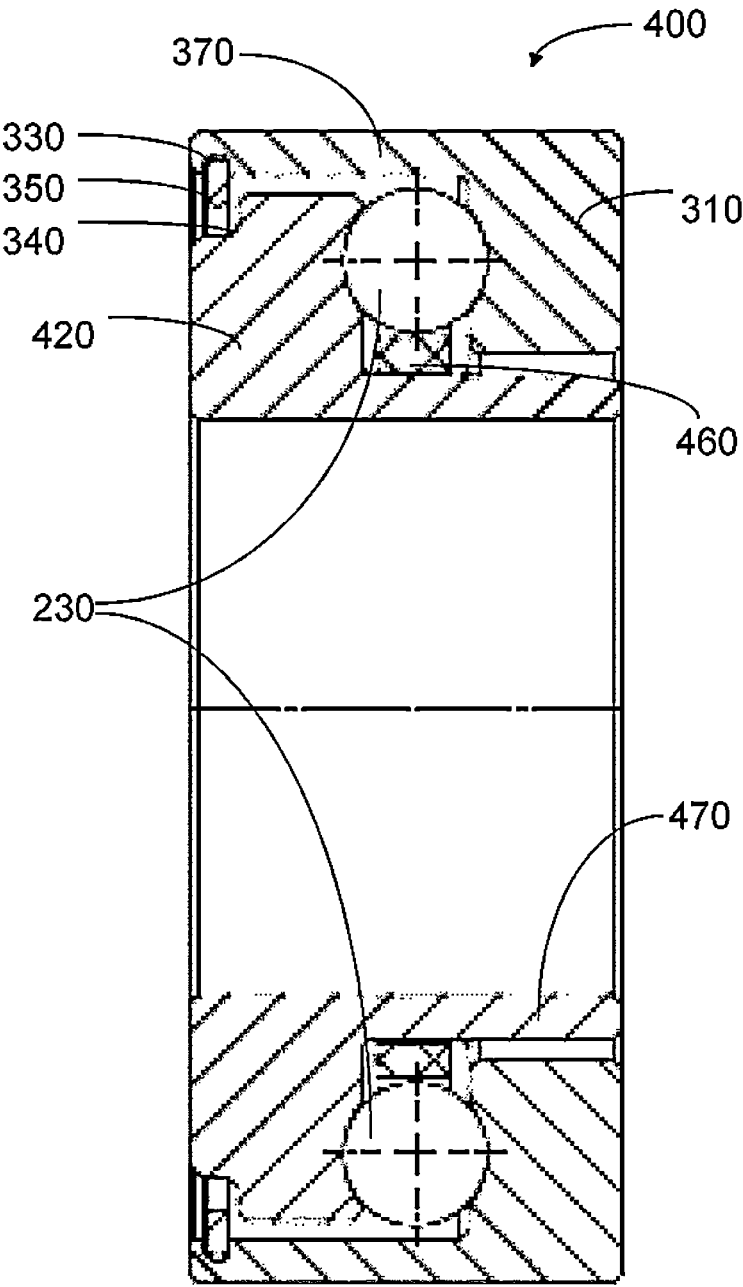
FIG. 4 shows an axial groove ball bearing with projections on the housing and shaft disc.

FIG. 4 shows an axial groove ball bearing 400 which, in comparison to the axial groove ball bearing 300, comprises a further developed shaft disc 420 and a further developed ball bearing cage 460. The shaft disc 420 has a projection 470 similar to the housing disc 310. In contrast to the housing disc 310, the projection 470 is arranged on the inside of the shaft disc and covers the balls 230. The ball bearing cage 470 is adapted to the developed shaft disc 420 in comparison to the cage 370, i.e. its inner diameter has been increased slightly in order to create space for the projection 470.

The balls 230 of the axial groove ball bearing 400 are covered on both sides, i.e. both of the projection 370 of the housing disc 310 as well as the projection 470 of the shaft disc. The balls 230 are therefore even better protected against lubricant discharge in the axial groove ball bearing 400 than in an axial groove ball bearing 300 according to FIG. 3. The additional protection also consists in that the projection 470 together with the housing disc 310 and the shaft disc 420 form a labyrinthine system that forces the air flow through it to make a multitude of changes in direction. The compressed air must flow through this labyrinth in order to have an effect, for example, on the balls 230, the ball bearing cage 460, their raceways and their lubrication. In this way, negative external influences are avoided or at least mitigated.

Furthermore, due to the two projections 370 and 470, the axial groove ball bearing 400 looks like a radial groove ball bearing from the outside. In addition, it can be handled like a radial groove ball bearing due to the anti-collision protection formed by the groove 330, the step 340 and the snap ring 350.

Figure 5:
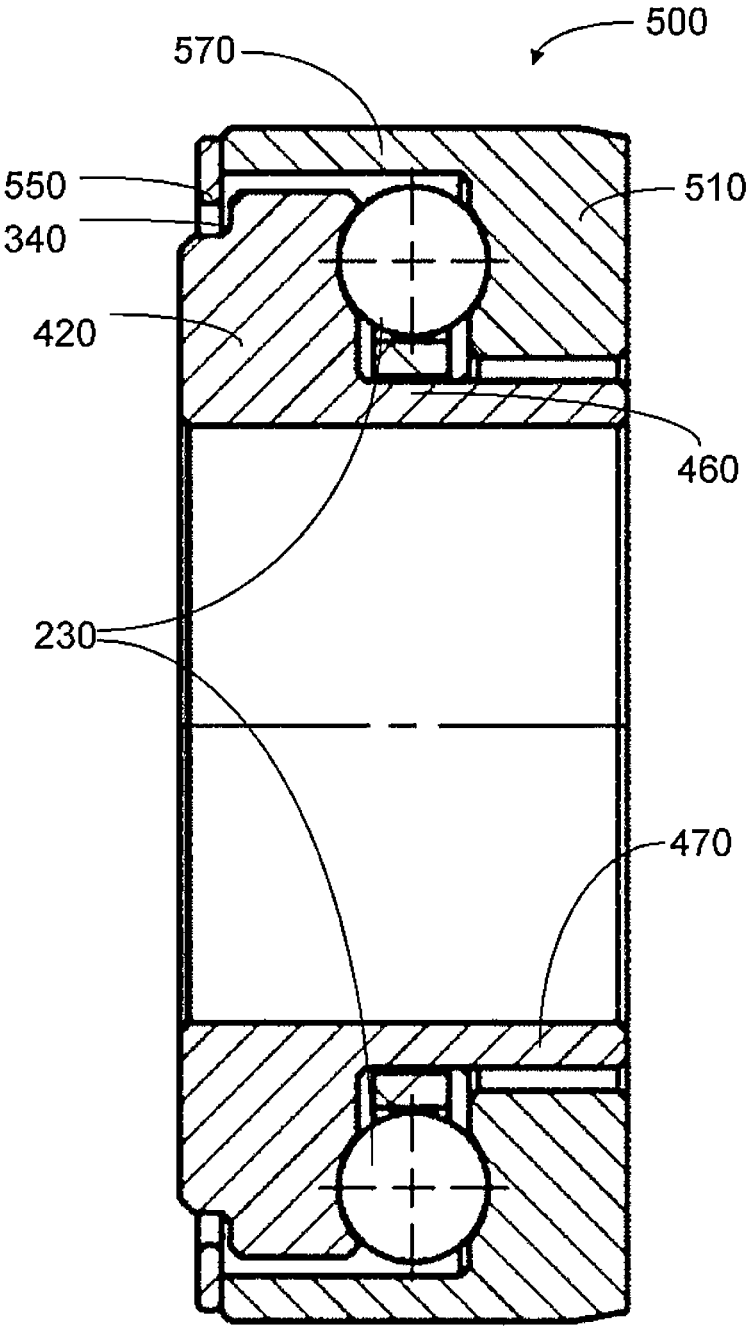
FIG. 5 shows an axial groove ball bearing with a ring on the projection of the housing disc.

FIG. 5 shows an axial groove ball bearing 500 with a housing disc 510 and a shaft disc 420. In comparison to the axial groove ball bearing 400, the axial groove ball bearing 500 has an alternative protection against decay. The bearing 500 is not protected from disintegrating by a snap ring as in the case of the bearing 400, but by a ring 550. The ring 550 is fixed laterally to a projection 570 of the housing disc 510. For this purpose, the ring 550 can, for example, be welded onto the projection after assembly.

So that the bearing 500 is not widened by the attached ring, the projection 570 is designed somewhat shorter than the projection 470 in the axial groove ball bearing 400. However, this represents only a preferred embodiment, i.e. such a ring can also be applied to a housing disc with a non-shortened projection which, together with the housing disc, extends over the entire width of the bearing.

Similarly to the axial groove ball bearing 400, the shaft disc 420 of the axial groove ball bearing 500 has a step 340 which is designed such that the ring 550 engages in it in the assembled state and thus the shaft disc 420 is blocked against axial displacement. In the aforementioned case with the projection that is not shortened, such a step 340 can be omitted.

To protect an axial groove ball bearing according to the invention from disintegrating, not only the projection of the housing disc can be used. In embodiments in which the shaft disc has a projection, an equivalent protection against decay can be achieved with comparable means at the end of the protrusion of the shaft disc. For this purpose, the housing disc may then have a step.

Figure 6:
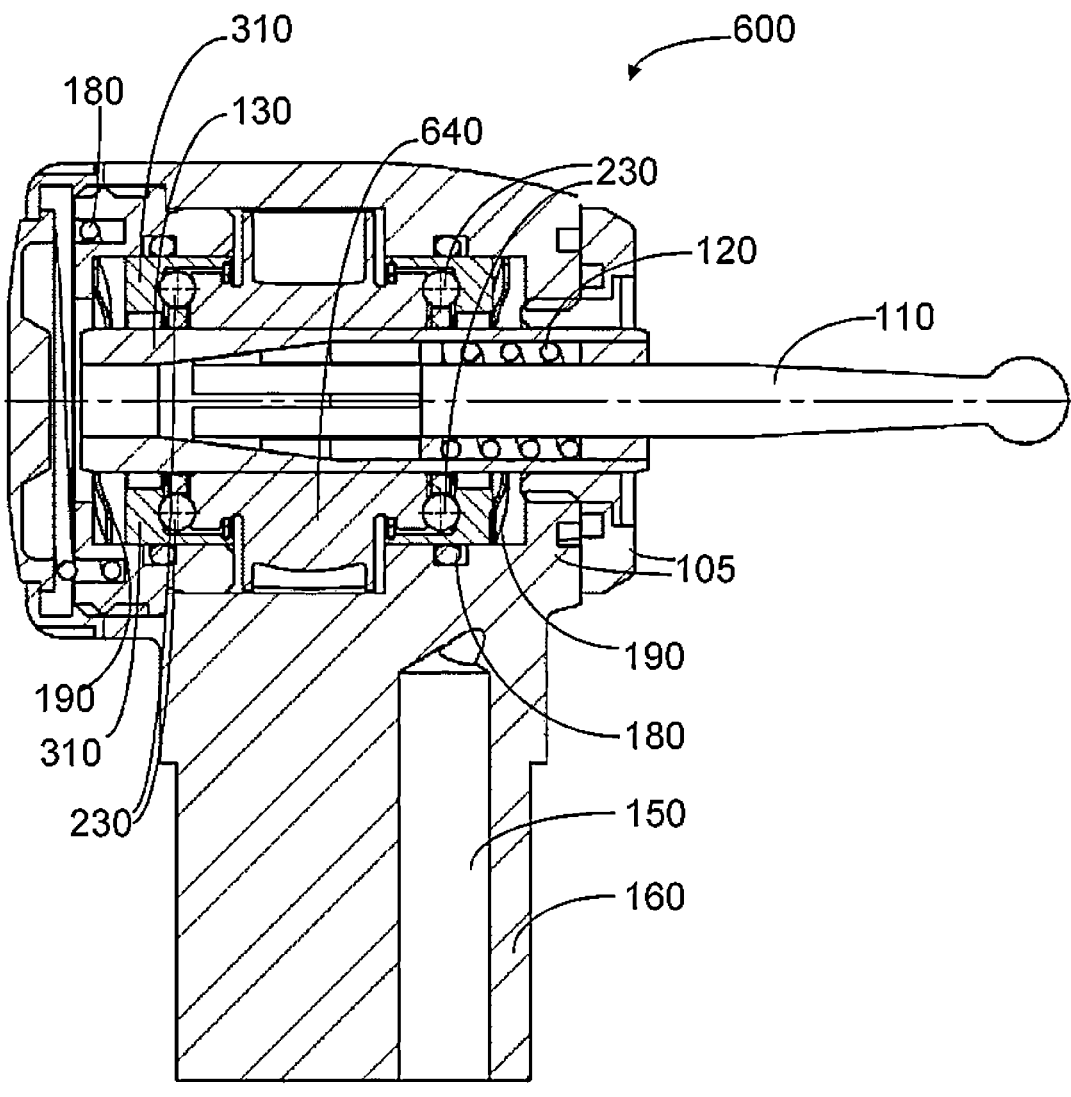
FIG. 6 shows a dental handpiece with a turbine wheel with integrated shaft discs of the axial groove ball bearings.

FIG. 6 shows a dental handpiece 600 which, in comparison to the dental handpiece 100, has a turbine wheel 640 with integrated shaft discs. The turbine wheel 640 represents a one-piece embodiment of the turbine wheel 140 and the shaft discs of the axial groove ball bearings.

Figure 7:
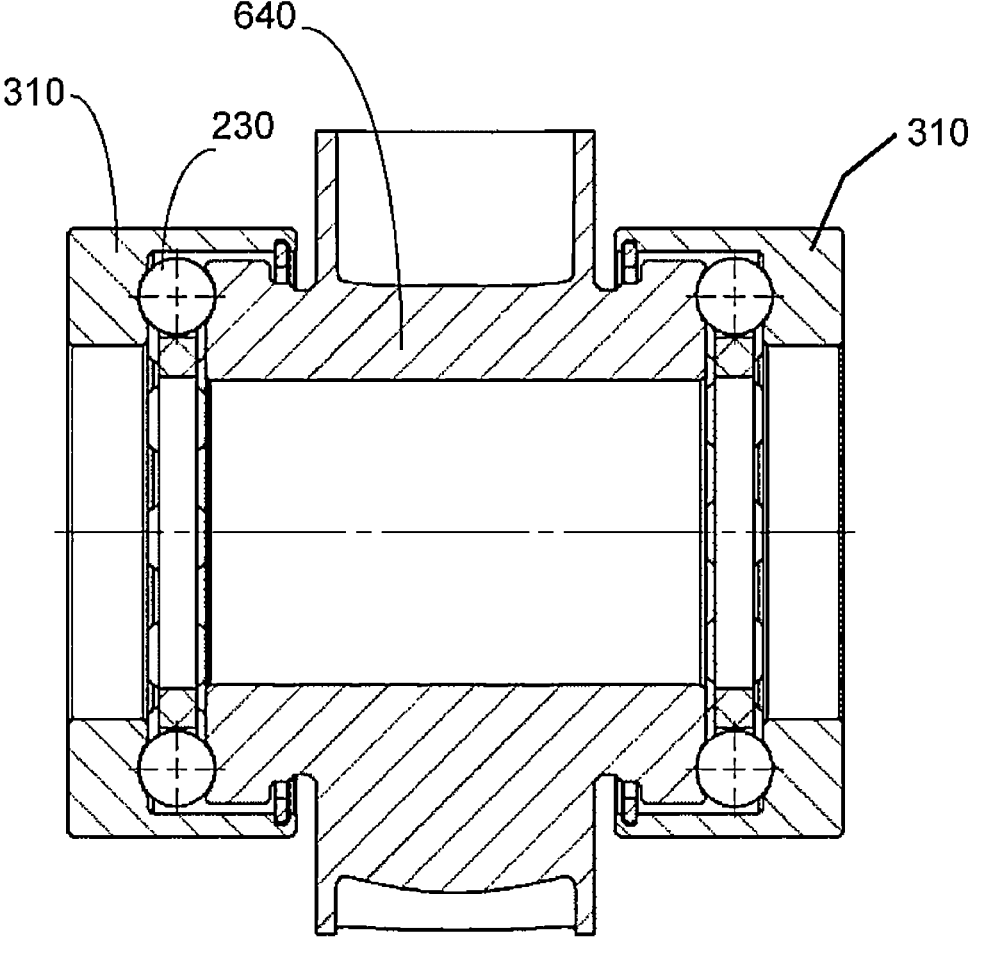
FIG. 7 shows a turbine wheel with integrated shaft discs.

FIG. 7 shows the combination of turbine wheel 640 with integrated shaft discs. Furthermore, FIG. 7 shows the roller bearings 230 and housing discs 310, which can also be seen in FIG. 6, again on a larger scale. The assembly can be assembled outside of the dental handpiece 600 and, in the assembled state, can be mounted on the rotor shaft and inserted into the housing 105.

In addition to a one-piece design of the turbine wheel and the shaft discs, the shaft discs and the rotor shaft can also be designed in one piece. This applies not only to the turbine wheels 140, rotor shafts 130 and shaft discs 320, but also to other embodiments of these three components.

Glossary

Projection
 A projection refers to a protruding part of a component that projects or protrudes from the component.
Axial Groove Ball Bearing
 An axial groove ball bearing is a ball bearing in which a housing disc, balls and a shaft disc are arranged one behind the other in the axial direction.
Drilling Friction
 Drilling friction occurs at the support point of a body rotating about the vertical axis on a plane.
Ball Bearing
 A ball bearing is a roller bearing in which the rolling elements are balls.
Radial Bearing
 A radial bearing is a roller bearing in which an outer ring, rolling elements and an inner ring are arranged one behind the other in the radial direction. The outer ring usually has a larger circumference than the inner ring. The inner ring, on the other hand, usually has a smaller circumference.
Slip
 Slip generally refers to the deviation in the speeds of mechanical elements in frictional contact with one another and the associated relative displacement of the mechanical elements associated with friction losses or power losses.
Chuck
 A chuck is a device that accommodates tools such as drills or milling cutters on tools (e.g. a dental handpiece).
Roller Bearing
 A roller bearing is a bearing for rotating components such as axles or shafts in which between at least a first ring, which is connected to a housing and is accordingly also called the outer ring, and at least a second ring, which is connected to the rotating component and is accordingly called the inner ring, rolling elements or rolling bodies reduce the frictional resistance between the rings or discs. Roller bearings can have one or more rows of rolling elements, which may be separated from one another by additional rings or discs. The rolling elements roll, for example, on hardened steel surfaces with optimised lubrication to keep rolling friction low. They move on raceways or grooves that are ground into the rings. Depending on their design, roller bearings can absorb radial and/or axial forces.
Rolling Element
 A rolling element is a part of a roller bearing that reduces the frictional resistance between the rings or discs of a roller bearing. Rolling elements in a roller bearing can be balls, rollers, cylinders, needles, barrels or cones.

Rolling Element Cage

A rolling element cage is an annular component that can accommodate the rolling elements of a roller bearing and keep them at fixed, preferably equal distances from one another. Rolling element cages can be made in one piece or in two pieces.

Wave Spring Disc

A wave spring disc is a wave-shaped spring or ring disc that produces its spring effect by being conical, bent on two sides, or wavy. Wave spring discs are used for defined, axial preloading of roller bearings, primarily miniature and small ball bearings.

REFERENCE NUMERALS

100 Dental handpiece
105 Housing
110 Dental tool
120 Chuck
130 Rotor shaft
140 Turbine wheel
150 Duct
160 Handle
170 Axial groove ball bearing
180 O-ring
190 Wave spring disc
200 Axial groove ball bearing
210 Housing disc
220 Shaft disc
230 Ball
240 Ball bearing cage
300 Axial groove ball bearing
310 Housing disc
320 Shaft disc
330 Groove
340 Step
350 Snap ring
360 Ball bearing cage
370 Projection
380 Bearing surface
400 Axial groove ball bearing
420 Shaft disc
460 Ball bearing cage
470 Projection
500 Axial groove ball bearing
510 Housing disc
550 Ring
570 Projection
600 Dental handpiece
640 Turbine wheel with integrated shaft disc

CITED LITERATURE

Cited Patent Literature

U.S. Pat. No. 4,249,869 A
DE 10 2014 220 872 A1
DE 10 2015 012 332 A1

The invention claimed is:

1. A dental handpiece for rotating a rotating dental tool, comprising:

a housing that has a handle and a chuck for receiving the dental tool in the dental handpiece;

a turbine which can be driven by compressed gas and/or compressed air and has a turbine wheel and a rotor shaft connected to the turbine wheel; wherein the rotor shaft is connected to the chuck to transmit the rotation of the turbine wheel to the chuck; and two axial groove ball bearings, which are arranged on an upper area and a lower area of the rotor shaft, wherein each axial groove ball bearing comprises a shaft disc, a housing disc, and a single row of rolling elements, the shaft disc and the housing disc are spaced apart in an axial direction of the rotor shaft and define opposing bearing surfaces that overlap in the axial direction of the rotor shaft, and the rolling elements are arranged between the shaft disc and the housing disc in the axial direction of the rotor shaft in contact with the opposing bearing surfaces;

wherein the shaft disc of each axial groove ball bearing acts on the rotor shaft or is integrated with the turbine wheel;

wherein the housing disc of each axial groove ball bearing is mounted in the housing;

wherein the housing disc of each axial groove ball bearing has a projection extending in the axial direction, and the projection covers the rolling elements of each axial groove ball bearing on the outside;

wherein a groove is defined on the inside of the projection and a step is defined on the outside of the shaft disc in the region of the groove; and wherein each axial groove ball bearing further comprises a snap ring configured to snap into the groove and engage with the step to retain the rolling elements between the shaft disc and the housing disc.

2. The dental handpiece according to claim 1, wherein each axial groove ball bearing is preloaded in the axial direction with a force greater than or equal to 3 N and less than or equal to 8 N.

3. The dental handpiece according to claim 1, wherein the turbine wheel and/or the rotor shaft and/or the shaft disc of each axial groove ball bearing are made in one piece.

* * * * *